(12) United States Patent
Dimou et al.

(10) Patent No.: US 10,271,224 B2
(45) Date of Patent: Apr. 23, 2019

(54) MTC UE AND METHOD FOR COVERAGE ENHANCEMENT USING RADIO LINK CONTROL CONFIGURATION

(71) Applicant: Intel IP Corporation, Santa Clara, CA (US)

(72) Inventors: Konstantinos D. Dimou, San Francisco, CA (US); Gang Xiong, Beaverton, OR (US); Yujian Zhang, Beijing (CN); Youn Hyoung Heo, San Jose, CA (US); Marta Martinez Tarradell, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 337 days.

(21) Appl. No.: 15/039,642

(22) PCT Filed: Jan. 30, 2015

(86) PCT No.: PCT/US2015/013961
§ 371 (c)(1),
(2) Date: May 26, 2016

(87) PCT Pub. No.: WO2015/117028
PCT Pub. Date: Aug. 6, 2015

(65) Prior Publication Data
US 2017/0171764 A1  Jun. 15, 2017

Related U.S. Application Data

(60) Provisional application No. 61/933,851, filed on Jan. 30, 2014.

(51) Int. Cl.
*H04W 24/02* (2009.01)
*H04W 4/70* (2018.01)
(Continued)

(52) U.S. Cl.
CPC ............ *H04W 24/02* (2013.01); *H04L 1/1848* (2013.01); *H04W 4/70* (2018.02); *H04W 16/18* (2013.01);
(Continued)

(58) Field of Classification Search
CPC ....... H04W 24/02; H04W 4/70; H04W 16/18; H04W 52/343; H04W 74/0833; H04W 52/283; H04L 1/1848
See application file for complete search history.

(56) References Cited

U.S. PATENT DOCUMENTS

2010/0296399 A1  11/2010  Watanabe
2013/0003542 A1   1/2013  Catovic et al.
(Continued)

FOREIGN PATENT DOCUMENTS

CN    105917692 A   8/2016
JP    2008042311 A  2/2008
(Continued)

OTHER PUBLICATIONS

"International Application Serial No. PCT/US2015/013961, International Search Report dated Apr. 30, 2015", 4 pgs.
(Continued)

*Primary Examiner* — Melvin C Marcelo
(74) *Attorney, Agent, or Firm* — Schwegman Lundberg & Woessner, P.A.

(57) ABSTRACT

An eNodeB (eNB) and user equipment (UE) are provided that detect whether the UE is in coverage enhancement mode and if so uses a modified version of the Radio Link Control (RLC) configuration in communications between the eNB and UE. Detection mechanisms may differ between the eNB and UE and may include direct signaling between the eNB and UE, the ability to receive control signaling only through particular modified signaling procedures, low power
(Continued)

of certain received control signals or lack of response to certain control signals within various predetermined time periods. The modified RLC configuration permits a smaller amount of data than a standard RLC configuration to be transmitted by a transmitting device before a receiving device is able to be polled for information regarding reception by the receiving device of the transmitted data.

29 Claims, 5 Drawing Sheets

(51) Int. Cl.
| | |
|---|---|
| *H04L 1/18* | (2006.01) |
| *H04W 52/34* | (2009.01) |
| *H04W 16/18* | (2009.01) |
| *H04W 74/08* | (2009.01) |
| *H04W 52/28* | (2009.01) |

(52) U.S. Cl.
CPC ..... *H04W 52/343* (2013.01); *H04W 74/0833* (2013.01); *H04W 52/283* (2013.01)

(56) References Cited

U.S. PATENT DOCUMENTS

| | | | | |
|---|---|---|---|---|
| 2013/0279490 | A1* | 10/2013 | Pani | .......... H04L 47/10 |
| | | | | 370/346 |
| 2014/0098761 | A1* | 4/2014 | Lee | ............ H04W 74/006 |
| | | | | 370/329 |
| 2016/0192376 | A1* | 6/2016 | Lee | ............ H04W 48/20 |
| | | | | 370/252 |

FOREIGN PATENT DOCUMENTS

| | | |
|---|---|---|
| JP | 2017504999 A | 2/2017 |
| KR | 101807982 | 12/2017 |
| WO | WO-2015117028 A1 | 8/2015 |

OTHER PUBLICATIONS

"International Application Serial No. PCT/US2015/013961, Written Opinion dated Apr. 30, 2015", 4 pgs.

Catt, "Discussion on mobility support for Low Complexity MTC UEs and MTC coverage enhancement", R2-134040, 3GPP TSG RAN WG2 Meeting #84, San Francisco, USA, [Online] retrieved from the internet: <(http://www.3gpp.org/ftp/tsg_ran/WG2_RL2/TSGR2_84/docs/R2-134040.zip)>, (Nov. 2, 2013), 1-4.

Mediatek Inc., "On Required System Functionalities for MTC UEs Operating in Enhanced Coverage Mode", R1-130218, 3GPP TSG RAN WG1 Meeting #72, St Julian's, Malta, [Online] retrieved from the internet: <(http://www.3gpp.org/ftp/tsg_ran/wg1_rl1/TSGR1_72/Docs/R1-130218.zip)>, (Jan. 19, 2013), 1-6.

ZTE, "Coverage Enhancement of Physical Broadcast Channel and SIB Transmission", R1-134302, 3GPP TSG RAN WG1 Meeting #74bis, Guangzhou, China,, [Online] retrieved from the internet: <(http://www.3gpp.org/ftp/tsg_ran/wg1_rl1/TSGR1_74b/Docs/R1-134302.zip)>, (Sep. 28, 2013), 1-6.

"European Application Serial No. 15744028.0, Extended European Search Report dated Jul. 20, 2017", 10 pgs.

"International Application Serial No. PCT/US2015/013961, International Preliminary Report on Patentability dated Aug. 11, 2016", 6 pgs.

"Korean Application Serial No. 2016-7016678, Office Action dated Mar. 23, 2017", (W/ English Translation), 5 pgs.

"Korean Application Serial No. 2016-7016678, Response Filed May 23, 2017 to Office Action dated Mar. 23, 2017", (W/ English Claims), 31 pgs.

Ericsson, et al., "Coverage enhancements for MTC—System informa", 3GPP Draft; R1-131680 Coverage Enhancements for MTC System Information, 3rd Generation Partnership Project (3GPP), Mobile Competence Centre ; 650, Route Des Lucioles ; F-06921 Sophia-Antipolis Cedex, [Online] retrieved from the internet: <http ://www.3gpp.org/ftp/tsg_ran/WG1 _RL1 /TSG R1_72b/Docs/>, (Apr. 16, 2013), 8 pgs.

"European Application Serial No. 15744028.0, Response Filed Feb. 19, 2018 to Extended European Search Report dated Jul. 20, 2017", 14 pgs.

"Japanese Application Serial No. 2016-535695, Office Action dated Jul. 11, 2017", w/English Translation, 5 pgs.

"Japanese Application Serial No. 2016-535695, Response Filed Oct. 11, 2017 to Office Action dated Jul. 11, 2017", (W/ English Claims), 17 pgs.

"On UL HARQ functionality and PHICH enhancement", MediaTek Inc.3GPP TSG-RAN WG1 #75, (Nov. 2, 2013).

"Proposed modification to the value range of PollPDU", Nokia Corporation, Nokia Siemens Networks, 3GPP TSG-RAN WG2 Meeting #63b is R2-085030, (Sep. 23, 2008).

* cited by examiner

```
                                        RLC-Config information element
--ASN1START
RLC-Config ::=              CHOICE{
    am                              SRQUENCE{
        ul-AM-RLC                       UL-AM-RLC,
        dl-AM-RLC                       DL-AM-Rlc
    },
    um-Bi-Directional               SRQUENCE{
        ul-UM-RLC                       UL-AM-RLC,
        dl-UM-RLC                       DL-AM-Rlc
    },
    um-Bi-Directional-UL            SRQUENCE{
        ul-UM-RLC                       UL-AM-RLC
    },
    um-Bi-Directional-DL            SRQUENCE{
        dl-UM-RDL                       DL-AM-RLC
    },
},
UL-AM-RLC ::=               SRQUENCE{
    t-PollRetransmit            T-PollRetransmit,
    PollPDU                         PollDDU,
    PollByte                        PollByte,
    maxRetxThreshold                ENUMERATED{
                                        t1,t2,t3,t4,t6,t8,t16,t32}
},
DL-AM-RLC ::=               SRQUENCE{
    t-Reordering                T-Reordering
    t-statusProhibit            T-StatusProhibit
},
UL-UM-RLC ::=               SRQUENCE{
    sn-FieldLength                  SN-FieldLength
},
DL-UM-Rlc ::=               SRQUENCE{
    sn-FieldLength                  SN-FieldLength
    t-Reordering                    T-Reordering
},
SN-FieldLength ::=          ENUMERATED{ *size5,* size10} t-PollRetransmit ::=        ENUMERATED{
                                ms5,ms10,ms15,ms20,ms25,ms30,ms35,
                                ms40,ms45,ms50,ms55,ms60,ms65,ms70
                                ms75,ms80,ms85,ms90,ms95,ms100,ms105,
                                ms110,ms115,ms120,ms125,ms130,ms135,
                                ms40,ms145,ms150,ms155,ms160,ms165,
                                ms,170,ms175,ms180,ms185,ms190,ms195
                                ms200,ms205,ms210,ms215,ms220,ms225
                                ms230,ms235,ms240,mn245,ms250,ms300
                                ms350,ms400,ms450,*ms500,*spare9,spare8,
                                spare7,spare6,spare5,spare4,spare3,
                                spare2,~~spare1~~}
```

*FIG. 5A*

```
PoolPDU  ::=                ENUMERATED{
                                p1,p2,p3,p32,p64,p128,p256,pinfinity}
PollByte ::=                ENUMERATED{
                                kB0.5,p1,kB1,kB2,kB4,kB8,kB16,kB25,kB50,kB75,kB100,kB125,kB150,
kB375, kB500,kB750,kB1000,kB1250,kB1500,kB2000,
                                kB3000,kBinfinity,spare1}
                            ENUMERATED{
                                ms0,ms5,ms10,ms15,ms20,ms25,ms30,ms35
                                ms40,ms45,ms50,ms55,ms60,ms65,ms70
                                ms75,ms80,ms85,ms90,ms95,ms100,ms110,
                                ms120,ms130,ms140,ms150,ms160,ms170,
                                ms180,ms190,ms200,ms400,ms500,spare1}

T-StatusProhibit ::=        ENUMERATED{
                                ms5,ms10,ms15,ms20,ms25,ms30,ms35,
                                ms40,ms45,ms50,ms55,ms60,ms65,ms70,
                                ms75,ms80,ms85,ms90,ms95,ms100,ms105,
                                ms100,ms115,ms120,ms125,ms130,ms135,
                                ms140,145,ms150,ms155,ms160,ms165,
                                ms170,ms175,ms180,ms185,ms190,ms195
                                ms200,205,ms210,ms215,ms220,ms225,
                                ms230,ms235,ms240,ms245,ms250,ms300
                                ms350,ms400,ms450,ms500,spare8,spare7,
                                spare6,spare5,spare4,spare3,spare2,
                                spare1}

--ASNISTOP
```

*FIG. 5B*

RRCConnectionRequest message

```
--ASN1START
RRCConnectionRequest ::=            SEQUENCE {
    criticalExtensions                  CHOICE {
        rrcConnectionRequest-r8             RRConnectionRequest-r8-IEs,
    }                                       SEQUENCE { }
}

RRCConnectionRequest-r8-IEs ::=     SEQUENCE {
    ue-Identity                         InitialUE-Identity,
    establishmentCause                  EstablishmentCause,
    spare                               BIT STRING (SIZE (1))
}

InitialUE-Identity ::=              CHOICE {
    s-TMSI                              S-TMSI,
    randomValue                         BIT STRING (SIZE (40))
}

EstablishmentCause ::=              ENUMERATED {
                                        emergency, highPriorityAccess, mo-signaling,
                                        mo-data, delayTolerantAccess-v1020, coverage
EnhancementModeData-v1xxx, coverageEnhancementModeSignalling-v1xxx, spare2,spare1}
```

*FIG. 6*

MTC UE AND METHOD FOR COVERAGE ENHANCEMENT USING RADIO LINK CONTROL CONFIGURATION

PRIORITY CLAIM

This application is a U.S. National Stage Filing under 35 U.S.C. 371 from International Application No. PCT/US2015/013961, filed Jan. 30, 2015 and published in English as WO 2015/117028 on Aug. 6, 2015, which claims the benefit of priority to U.S. Provisional Patent Application Ser. No. 61/933,851, filed Jan. 30, 2014, each of which is incorporated herein by reference in its entirety.

TECHNICAL FIELD

Embodiments pertain to wireless communications. Some embodiments relate to cellular communication networks including LTE networks. Some embodiments relate to enhanced coverage communication. Some embodiments relate to physical random access channel operation.

BACKGROUND

With the increase in different types of devices communicating over networks to servers and other computing devices, usage of third generation long term evolution (3GPP LTE) systems has increased. In particular, both typical user equipment (UE) such as cell phones and machine type devices (MTDs) currently use 3GPP LTE system. Machine Type Communications (MTC) from MTDs poses a particular challenge due to low energy consumption of the MTC UEs involved in such communication. In particular, MTC UEs are less computationally powerful and have less power for communication, and many are configured to remain essentially indefinitely in a single location. Examples of such MTC UEs include sensors (e.g., sensing environmental conditions) or microcontrollers in appliances or vending machines. In some circumstances, the MTC UEs may be located in areas where there is little to no coverage, such as inside buildings, or in isolated geographical areas. Unfortunately, in a number of cases, MTC UEs do not have sufficient power for communications with the nearest serving base station (enhanced Node B (eNB)) with which they communicate to satisfy normal Radio Link Control (RLC) protocol requirements within the current 3GPP standard. The RLC protocols may also cause similar problems for non-stationary wireless UEs, such as mobile phones, that are disposed in a network area with poor coverage, i.e., one in which the link budget is several dB below typical network values.

In particular, because transmission power cannot be increased either by the MTC UE or eNB, to achieve coverage extension and obtain additional dB in link budget, signals are repeatedly transmitted from the transmitting device (MTC UE or eNB) over an extended period to accumulate energy at the receiving device. While timing considerations in repeating the transmission in typical UEs such as smart phones is generally not an issue due to the communication rate of typical UEs, it may become problematic for MTC UEs that are to periodically provide information via the network. More specifically, because the communication rate between the MTC UE and eNB serving the MTC UE is relatively slow, and typical periodicity (which is set by the server rather than the MTC UE) is not low, communications may stall between the MTC UE and the serving eNB.

It would be therefore desirable for a network or UE to determine whether the use of an alternate RLC protocol for specific UEs in the coverage area is appropriate, as well as for UEs in a coverage enhancement mode to use the coverage enhancement RLC protocol.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIGS. 5A and 5B illustrate an RLC configuration information element in accordance with some embodiments.

FIG. 6 illustrates a modified RRCConnectionRequest message according to one embodiment.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
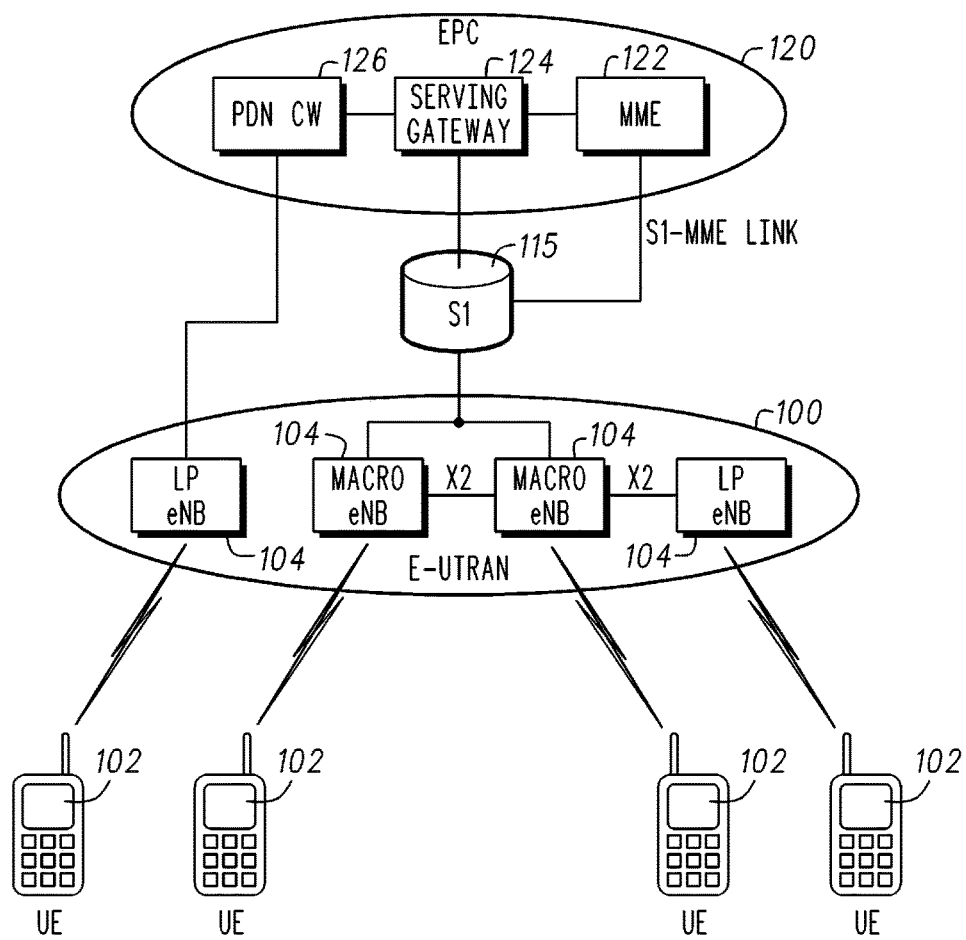
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers. Other technologies may also be used, such as Non-Orthogonal Multiple Access (NOMA), Code Division Multiple Access (CDMA), and Orthogonal Frequency-Division Multiple Access (OFDMA).

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks.

As described above, because transmission power is unable to be increased by UEs or the serving enhanced Node Bs (eNBs) in coverage enhancement areas, the same packet data is repeatedly transmitted to increase signal power at the receiver. However, due to the reduced communication rate between UEs and the base stations, in one embodiment, the standard RLC configuration (i.e., RLC protocols) is changed to a coverage enhancement RLC configuration for UEs in coverage enhancement mode and situated in locations where the link budget to the nearest serving base station is worse than a typical link budget value in the network and additional link budget is to be obtained without increasing transmission power. The UE, which may be a stationary wireless UE (that remains indefinitely in a single location) using MTC such as a sensor or M2M UE, determines whether to implement the coverage enhancement RLC configuration, and, if so, uses the coverage enhancement RLC configuration to communicate with the eNB. In one embodiment, the coverage enhancement RLC configuration contains values of RLC counters and timers that are available only to UEs in a coverage enhancement mode and that decrease an amount of time before the UE in the coverage enhancement mode is able to request acknowledgment of a transmission to the eNB compared with a non-coverage enhancement RLC configuration.

In various embodiments, the UE receives the coverage enhancement RLC configuration from a broadcast by the eNB or stores in memory the coverage enhancement RLC configuration for automatic implementation. Thus, in some embodiments, the UE determines whether to implement the coverage enhancement RLC configuration without the transceiver receiving the broadcast. Alternatively or in addition, the eNB may store in memory that the UE is to communication using the coverage enhancement RLC configuration, e.g., upon receiving a RRC connection release from the UE. In some embodiments, the eNB transmits the broadcast without regard as to whether any UEs being served by the eNB intend to use the coverage enhancement RLC configuration. In other embodiments, the eNB transmits the broadcast based on a request for the coverage enhancement RLC configuration from a UE in coverage enhancement mode. In some embodiments, the UE transmits to the eNB a Radio Resource Control (RRC) Connection Request (RRCConnectionRequest) using the coverage enhancement RLC configuration to establish an RRC Connection with the eNB. In some embodiments, the coverage enhancement RLC configuration is contained in an Information Element (IE) in a System Information Block (SIB), and the coverage enhancement RLC configuration provides values of "PollPDU" and "PollByte" sufficient to prevent an RLC transmitter window of the UE from stalling or waiting for several minutes before getting feedback from the eNB. Thus, the coverage enhancement RLC configuration in various embodiments is broadcast by the eNB and applied by the eNB and coverage enhancement UE after the network and the coverage enhancement UE detect that the coverage enhancement UE is in need of coverage enhancement, or is automatically used by the eNB and coverage enhancement UE during RRC connection establishment without the RLC configuration being provided via handshaking. This differs from the current procedure of RRC connection establishment, in which a standard RLC configuration is initially used and may be later adjusted if desired though handshaking, which does not avoid the problems indicated herein.

Figure 2:
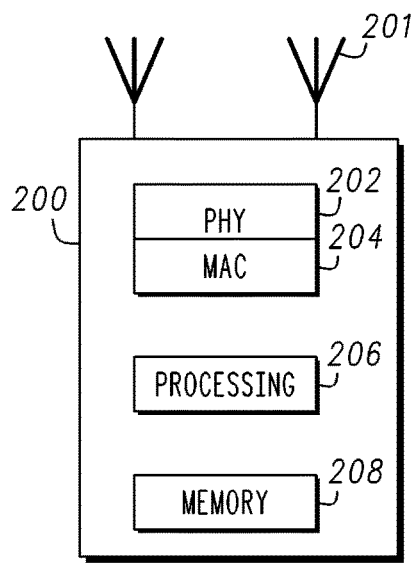
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

As above, many different types of UEs may communicate using network, including MTC UEs. Generally, in coverage enhancement mode, a significant amount of additional link budget (up to about 15 dB) may be needed to allow reliable communication between a UE and the serving eNB. To obtain this link budget, packets transmitted between the UE and eNB may be repeated a large number (>100) of times. 3GPP LTE systems generally during data communication use an RLC configuration in which acknowledgment of data reception and other control information is also provided between the UE and eNB. Normally, transmission of a single packet data unit (PDU) of, say, 1000 bits takes about 1 ms and an acknowledgment is provided within few ms, which may be in response to a request from the transmitting device for receipt information. For a MTC UE or other UE in coverage enhancement mode (herein also referred to as a coverage enhancement mode UE) however, transmission of each PDU may take significantly longer—for example 100-200 ms to transmit a packet of 40 bytes. This may cause a problem in certain instances, and requires a discussion of the RLC configuration in the current 3GPP LTE specification.

The 3GPP LTE specification 3GPP TS 36.331 contains particulars of layer 2 protocols such as media access control (MAC), radio link control (RLC), and radio resource control (RRC) used in wireless 3GPP communications. The RLC configuration contains parameters that relate to requests for information transmitted by the transmitting device (e.g., either the coverage enhancement mode UE or the eNB) from the receiving device (e.g., the other of the coverage enhancement mode UE or the eNB). In particular, the RLC configuration contains the parameters "PollByte" and "PollPDU," which may be particularly problematic in cases in which coverage enhancement is desired. "PollByte," whose smallest value is 25 kBytes in the current implementation of 3GPP TS 36.331, counts the number of bytes transmitted by the transmitting device prior to the transmitting device being able to poll the receiving device. "PollPDU" defines the number of RLC PDUs to be transmitted before the transmitting device is able to start polling the receiving device to request an acknowledgement of the number of PDUs received. The PollPDU may take any value greater than or equal to 4 PDUs. In one example, MTC UEs having to transmit a single PDU of 1000 bits that is to be repeated 100-200 times to build up energy at the eNB, results in it taking at least several minutes to transmit the PDU. Sensors and other MTC UEs typically provide updates to the eNB every few minutes, leading to a number of issues with the RLC transmission window. In particular, this leads to the inability of a MTC UE to poll the eNB to obtain information regarding the reception of the RLC PDU. If an issue arises in transmission of the PDU, the RLC transmission window is consequently likely to stall. This leads to the MTC UE being unable to advance the RLC transmission window, or the RLC transmission window having to wait for the transmission of 4 PDUs before polling the eNB, which exceeds the update time by a significant margin.

To reduce the above problems caused by delay in waiting for acknowledgment due to polling, the RLC configuration parameters "PollByte" and "PollPDU" are allowed to be reduced to below 4 PDU and/or to significantly less than 25 k bytes, respectively only for enhanced coverage mode UEs. Once both the eNB and UE recognize that communications therebetween are to use an enhanced coverage mode link, the appropriate RLC configuration is provided from the eNB or otherwise used by the enhanced coverage mode UE. After transmission of the required number of PDUs or the required number of bytes of the first PDU, as defined by the enhanced mode RLC configuration used by the enhanced coverage mode UE and eNB, which may take several hundred ms, the transmitting device may poll the receiving device to obtain information regarding the number of bytes received by the receiving device. This reduction in both the number of PDUs and the amount of data that are needed to be transmitted before polling can occur avoids stalling of the transmission window.

The RLC configuration parameters "PollByte" and "PollPDU," however, in one embodiment may be adjusted only for enhancement mode UEs. This means that rather than using the normal default values of these parameters as defined by 3GPP TS 36.331, both the transmitting device and receiving device detect the desire to communicate in the coverage enhancement mode and respond appropriately.

Figure 3:
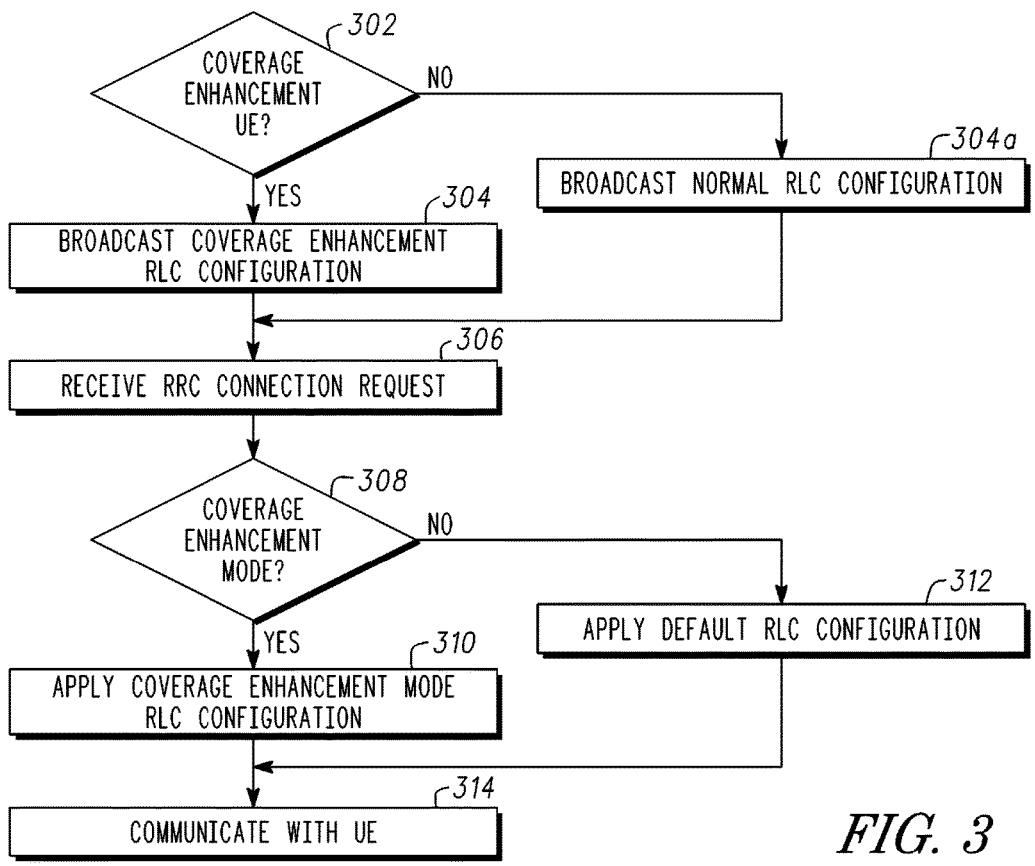
FIG. 3 illustrates a flowchart of a method at an eNB in accordance with some embodiments.

FIG. 3 illustrates a flowchart of a method at an eNB in accordance with some embodiments. In step 302, the eNB determines whether any UEs in the cell served by the eNB desire coverage enhancement. To make this determination prior to receiving communication from the UEs, the eNB may store information related to previous RRC connections established with coverage enhancement mode UEs. As UEs that are mobile may intermittently enter coverage enhancement mode, the stored information is most useful when the eNB is able to determine whether such UEs, including MTC UEs such as sensors, are stationary. In some embodiments, the stored information may contain only information that at least one coverage enhancement mode UE has previously been present in the cell served by the eNB. In other embodiments, the stored information may contain the identity of coverage enhancement mode UEs (such as IP addresses of the UEs) and whether or not the coverage enhancement mode UEs are mobile UEs. The mobility information may be obtained from the UE itself or may be provided by other network UEs, such as other eNBs (e.g., if a handoff to the present eNB occurred, the UE is mobile) or servers (e.g., servers to which the UE reports or network servers such as location registers or billing servers). In these circumstances, the eNB may, if mobility information of the UEs is known, ignore information regarding mobile UEs that have previously been in coverage enhancement mode in discerning the existence of one or more coverage enhancement mode UEs. Alternately, the eNB may retain information regarding a particular mobile UE, in one embodiment only if the particular mobile UE was in coverage enhancement mode a significant number of times or percentage of times the eNB served the particular mobile UE. In other embodiments, the eNB may request information about coverage enhancement mode from a network server rather than itself making judgments. Determination by the eNB of the presence of coverage enhancement mode UEs in the cell permits the eNB to use procedures specific to coverage enhancement mode for those UEs, e.g., particular System Information Blocks (SIBs), random access resource allocation, paging, scheduling, for UEs in coverage enhancement mode.

If the eNB determines that at least one coverage enhancement mode UE exists then, in step 304, the eNB broadcasts a coverage enhancement RLC configuration to all UEs in the cell served by the eNB. If the eNB determines that no coverage enhancement mode UE exists in step 302 then, in step 304a, the eNB broadcasts the normal RLC configuration to all communication UEs in the cell served by the eNB.

The RLC configuration (whether normal RLC configuration or coverage enhancement RLC configuration) is contained in an Information Element (IE) in a SIB of the broadcast. As is known, SIBs contain configuration information and parameters that a UE needs to communicate with the eNB. Specifically, at a minimum SIB-1 and SIB-2 are used to establish access with any eNB. SIB-2, in particular, contains radio resource configuration information common for all UEs, including common and shared channel configuration, Random Access Channel-related configuration, timers, and uplink power controls. In one embodiment, the IE used in the coverage enhancement RLC configuration can be appended to existing IEs in SIB-2. In another embodiment, the IE used in the coverage enhancement RLC configuration can be appended to existing IEs in SIB-14, which contains power control information applied to dedicated and common physical channels in LTE time division duplexed signals. The RLC configuration may also be provided in a new SIB defined for coverage enhancement.

In another embodiment, steps 302 and 304 may not be present.

The eNB, in step 306, subsequently receives an RRC connection request from a UE being served by the eNB. The RRC connection request requests establishment of an RRC connection with the eNB in response to the UE initiating a phone call or a data session. Alternately, the eNB may transmit a paging message to the UE and receive the RRC connection request in response from the UE. The eNB determines, in step 308, whether coverage enhancement mode is appropriate for the UE from which the RRC connection request was received.

There are several ways in which the eNB may determine that the UE is in coverage enhancement mode. The eNB may use only one of these, or may combine any or all of these to decide whether the UE is in coverage enhancement mode. In one example, the eNB may determine that the UE is in coverage enhancement mode in response to paging the UE. The eNB may use standard RRC paging mechanisms. In this case, the eNB may determine that a particular stationary UE in the cell is a coverage enhancement mode UE after no response to the paging is received within a predetermined paging period or after a predetermined number of unsuccessful paging attempts have been made within the paging period. Alternatively, or in addition, the eNB may determine that a particular UE is in coverage enhancement mode if paging procedures specific to coverage enhancement mode UEs are also instituted by the eNB and the particular UE is able to be reached only by using the specific paging procedures. Note that for mobile UEs, using paging to determine coverage enhancement mode may be an unreliable method as mobile UEs are able to move in and out of regions of the cell with different link strengths, all of which that are covered by the eNB.

In another embodiment, rather than a specific paging process or specific paging resources being used, specific Physical Random Access Channel (PRACH) resources may be set aside for random access by UEs in coverage enhancement mode. Depending on the system, the PRACH resources may be reserved in any domain, including time, frequency, or code. Thus, the eNB may determine that a UE making use of the specific coverage enhancement mode PRACH resources is a coverage enhancement mode UE.

In another embodiment, when a particular UE attaches to the eNB, the eNB receives a plurality of random access preambles from that UE. Each preamble has a particular received power associated with it. The eNB may determine that the UE is in coverage enhancement mode if a predetermined number of consecutive received preambles from the UE have a power below that of a predetermined preamble power threshold. The preamble power is set to be above the sensitivity level of the eNB and different from the miss detection level.

Similarly, normally the eNB receives the random access preambles, responds, and then receives a RRC connection request message from the UE. Assuming that either the random access preambles meet the predetermined preamble power or the eNB does not use the power of the random access preambles to determine whether the UE is in coverage enhancement mode, the power of the RRC connection request may be used. In this case, the eNB may keep track of RRC connection requests from the UE and determine that the UE is in coverage enhancement mode if the power of a consecutive number of transmission time intervals of the RRC connection request is below a predetermined connection request power threshold. In other embodiments, this (and other embodiments described herein) may occur not only during initial RRC connection, but also at any point the RLC configuration is configured or reconfigured, i.e., during RRC connection reconfiguration or RRC connection reestablishment.

In another embodiment, rather than instituting a specific paging mechanism or keeping track of either paging attempts or consecutive power measurements, the eNB may rely on direct signaling from the UE to determine that the UE is in coverage enhancement mode. For example, a UE that is in coverage enhancement mode may use only a particular one or set of the 64 random access preambles, automatically signaling to the eNB that it is in coverage enhancement mode. In this case, the random access preamble or specific preamble combination may be unselectable by UEs that are not in coverage enhancement mode (i.e., if a UE not in coverage enhancement mode selects the preamble combination, it is discarded and one or more of the preambles reselected). The UE may later confirm to the eNB that it is in coverage enhancement mode in a separate communication, such as a specific RRC connection request. FIG. 6 illustrates a modified RRCConnectionRequest message according to one embodiment. In particular, the modifications to the RRC connection request message are shown in FIG. 6 in bold, underlined and italic fonts. To follow ASN.1 syntax, the spare values in FIG. 6 are marked as strikethrough. In other embodiments, the RRC connection request message may be modified so that the "IE Initial-UE-Identity" additionally carries an indication that the UE is in coverage enhancement mode. Alternatively, the UE-Identity (S-TMSI) within the "IE Initial-UE-Identity" field may simply contain a value indicating that the UE is in coverage enhancement mode.

If the eNB determines, in step 308, that the UE from which the RRC connection request was received is in coverage enhancement mode, the eNB applies the coverage enhancement RLC configuration in step 310. If not, the eNB may determine that the UE is a typical UE and apply the default RLC configuration in step 312. In step 314, the eNB uses whichever RLC configuration it has determined as appropriate in communications with the UE, transmitting the coverage enhancement RLC configuration parameters during RRC connection establishment (or re-establishment, during radio bearer configuration/re-configuration). Thus, assuming that the coverage mode UE transmits an RRC connection request to the eNB (rather than being paged by the eNB), the eNB responds to the coverage enhancement UE with an RRC Connection Setup message or a RRC Connection Reject message. If the eNB responds to the coverage enhancement UE with an RRC Connection Setup message, the coverage enhancement UE in turn replies to the eNB with an RRC Connection Setup Complete message.

In a different embodiment, the eNB may act initially independent of the existence of UEs in the cell. This is to say that rather than making an initial determination of whether coverage enhancement mode UEs are present in the cell, as in step 302, the eNB may determine whether it is able to provide service to UEs when the coverage enhancement RLC configuration is used. If so, the eNB broadcasts support of coverage enhancement mode UEs (i.e., that the coverage enhancement RLC configuration is available) and determines which RLC configuration is to be used from the RRC connection request or other information received from the UE.

Moreover, in various embodiments, coverage enhancement and UEs in coverage enhancement mode may be able to be separated into different categories dependent on the network conditions and UE capabilities. This leads to different thresholds (e.g., link budget thresholds) being able to be used by the eNB and UEs served by the eNB. For example, the coverage enhancement may be split into an arbitrary number of levels, such as minimal (0-5 dB link budget enhancement), moderate (5-10 dB link budget enhancement), and severe (10-15 dB link budget enhancement) coverage enhancement. In this case, the coverage enhancement RLC configuration transmitted by the eNB may be UE specific. Moreover, the different RLC configurations may be broadcast to the UE with IEs of an SIB (as above, SIB-2 or SIB-14 for example) and thus signaled using a number of bits dependent on the number of configurations (e.g., 3 or fewer coverage enhancement RLC configurations can be transmitted using two bits). Alternatively, of course, the default coverage enhancement RLC configuration may be pre-defined within 3GPP TS 36.331 and configured to all UEs served by the eNB. The default coverage enhancement RLC configuration may be provided to UEs served by the eNB with dedicated RRC signaling.

Figure 4:
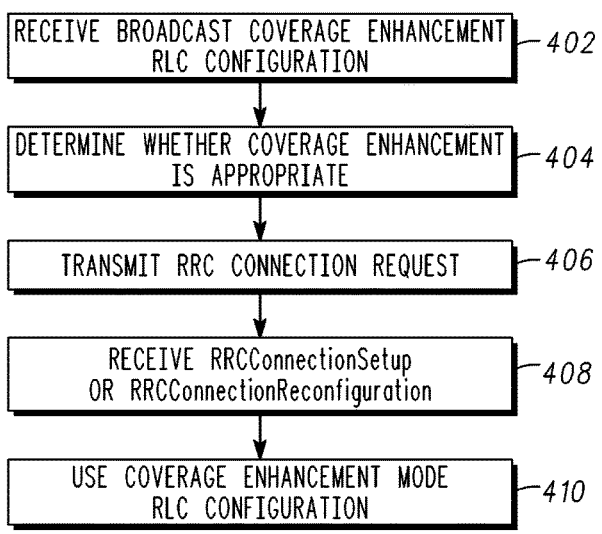
FIG. 4 illustrates a flowchart of a method at a coverage enhancement mode UE in accordance with some embodiments.

A flowchart of a method at a coverage enhancement mode UE in accordance with some embodiments is illustrated in FIG. 4. As shown, the UE receives a signal from the eNB serving the UE in step 402. The signal may be, for example, a broadcast or unicast message from the eNB. The broadcast contains the coverage enhancement RLC configuration in IEs of an SIB. The UE determines in step 404 whether coverage enhancement is appropriate for communicating with the eNB. Alternately, if the UE has already communicated with the eNB, the UE may store the enhancement mode RLC configuration and subsequently use the enhancement mode RLC configuration in future RRC connection establishment. The UE may automatically use the stored enhancement mode RLC configuration or may receive information from the eNB (such as one or more bits in the SIB) defining which RLC configuration to use.

There are several ways that the UE may determine that coverage enhancement is appropriate for communicating with the eNB. These are similar to those discussed above in relation to eNB determination. The techniques described herein for UE determination may be used individually or in combination to make the determination. For example, as above, the eNB may adopt specific paging procedures for UEs in coverage enhancement mode. The UE in FIG. 4 may in this case determine that coverage enhancement is desirable for communicating with the eNB if it can be reached by the eNB only by the eNB using the coverage enhancement specific paging procedures.

In another example, the downlink synchronization process used when the UE is first turned on and performs an initial cell search to connect to the cellular network may be used to determine whether the UE is in coverage enhancement mode. In 3GPP systems, the eNB sends primary and secondary synchronization signals to the UE. The primary signal is used for timing and frequency acquisition while the secondary signal is used to acquire cell-specific information. The UE may determine that coverage enhancement is appropriate for communicating with the eNB if either the primary or secondary synchronization signal is not obtained within a predetermined sync period or after a predetermined number of consecutive times that synchronization acquisition has exceeded the predetermined sync period. In addition, the UE may determine that coverage enhancement is appropriate for communicating with the eNB if alternate synchronization signals are adopted in the 3GPP standard to be used for coverage enhancement mode UEs, and the UE obtains downlink synchronization from the eNB only by using these alternate synchronization signals.

In another embodiment, the UE may instead use timing of the random access procedure to determine whether coverage enhancement is appropriate for communicating with the eNB. The random access procedure includes the UE transmitting the preamble sequence to the eNB, receiving a random access response at the eNB, transmitting to the UE the random access channel response using the information contained in the random access response, and contention resolution. Upon reception of the random access response, the UE issues an RRC connection request. The 3GPP standard indicates that the random access procedure should be completed within a predetermined access period. Thus, if it is not (or after a predetermined number of consecutive attempts exceeding the access period), the UE may determine that coverage enhancement is appropriate for communicating with the eNB. Moreover, the UE may determine that coverage enhancement is appropriate for communicating with the eNB if a specific random access signal structure and procedure for UEs in coverage enhancement mode is used and this signal structure is only manner in which the UE is able to complete the random access procedure.

In another embodiment, the UE may use information blocks (SIBs or the Master Information Block (MIB)) to determine that coverage enhancement is appropriate for communicating with the eNB. Specifically, similar to synchronization, the UE may measure the acquisition time of system information via different information blocks and determine that coverage enhancement is appropriate for communicating with the eNB when the time exceeds a acquisition period or after a predetermined number of consecutive times that system acquisition exceeded the acquisition period. As above, the UE may determine that coverage enhancement is appropriate for communicating with the eNB if an alternate system information broadcasting structure and procedure is adopted in the 3G PPP standard to be used for coverage enhancement mode UEs, and the UE is able to obtain system information from the eNB only by using the alternate procedure.

In another embodiment, the UE may use the Reference Symbols Received Power (RSRP), which measures the average received power over the resource elements that carry cell-specific reference signals within the desired bandwidth, in much the same way power thresholds may be used by the eNB to determine coverage enhancement mode status. Specifically, the UE may determine that coverage enhancement is appropriate for communicating with the eNB if the RSRP for a predetermined amount of time is below a predetermined symbol threshold.

As shown, the UE determines that it is appropriate to use the coverage enhancement RLC configuration. The UE subsequently transmits a modified RRC connection request to the eNB in step 406 and receives a response from the eNB in step 408. The modified RRC connection setup, as shown in FIG. 6, does not contain the IE "RLCConfig." Alternatively, the message RRCConnectionReconfiguration, can be used instead of RRCConnectionSetup at a later stage during the course of the RRC connection. At this point, both the UE and the eNB have sufficient information that allows them to determine that the UE is in coverage enhancement mode. The RRC connection setup is sent using the coverage enhancement RLC configuration received in step 402. Assuming that the response from the eNB is a RRC Connection Setup message rather than an RRC Connection Reject message, the coverage enhancement UE in turn replies to the eNB with an RRC Connection Setup Complete message and continues to use the coverage enhancement RLC configuration in step 410.

An RLC configuration information element according to one embodiment is shown in FIGS. 5A and 5B. The coverage enhancement RLC configuration parameters use timers and counters that better fit the rate of communication of coverage enhancement mode UEs than the parameters of the default RLC configuration. In FIGS. 5A and 5B, most of the parameters remain unchanged, and some default configuration parameters cannot currently be adjusted in the standard. For example, radio bearers transfer either user data (data radio bearers (DRBs)) or control data (signaling radio bearers (SRBs)). SRBs communicate using RRC signaling messages and operate in acknowledged mode (AM) RLC, which requires that a receiving device continuously send data to the transmitting device indicating that the receiving device has successfully received the data. This AM RLC cannot be changed from the default configuration. Parameters of the default coverage enhancement RLC configuration that are not changed from 3GPP TS 36.331 are shown in plain text. Other parameters of the default coverage enhancement RLC configuration that may be adjusted are shown in different fonts. In particular, the default coverage enhancement RLC configuration parameters are shown in FIGS. 5A and 5B in bold, underlined and italic fonts. In addition, new values for some of the parameters of the RLC configuration have been added in addition to the default coverage enhancement RLC configuration parameters. These new non-default coverage enhancement RLC configuration parameters are shown in bold, underlined in FIGS. 5A and 5B. Also of note is that some of the new values replace spare values of the various parameters. As above, to follow ASN.1 syntax, the spare values in this case are marked as strikethrough in FIGS. 5A and 5B. If spare values are not available, however, a new values for the parameter cannot be added.

Specifically, the "pollPDU" and "pollByte" are respectively set to 1 PDU or 500 bits, which allows the transmitting UE to poll the receiving UE after transmission of a single PDU or after a relatively small amount of data. This is in contrast to the default RLC configuration in which, for example, "pollPDU" is set to 4 PDUs. Also of note is that lower values are added to these fields permit alternate values to be used if the coverage enhancement mode UE desires. Specifically, "pollPDU" can be set to values of 2 or 3 PDUs, while "pollByte" can be set to 1 kB, 2 kB, 4 kB, 8 kB, or 16 kB. None of these values presently exist in the current 3GPP TS 36.331 standard. The parameter "SN-FieldLength" indicates the field size of the unacknowledged mode RLC sequence number, which is set to 5 bits in the coverage enhancement RLC configuration. The values of "t-reordering," "t-StatusProhibit," and "t-pollRetransmit" are timers that are set to higher values, primarily 500 ms. These parameters respectively control the timing before re-ordering, status reporting and repetitive polling occur during transmission of a given PDU. By increasing the time for each of these, the coverage enhancement RLC configuration is able to slow down these processes to correspond with the slower communication rate.

Thus, in various embodiments, both the eNB and UE detect whether the UE is in coverage enhancement mode and act accordingly by using a modified version of the RLC configuration in communications between the eNB and UE. The detection mechanisms may differ between the eNB and UE and may include direct signaling between the eNB and UE, control signaling being able to be received only through particular modified signaling procedures, or determining power or timing of various control signals, for example. The RLC configuration permits a smaller amount of data than a standard RLC configuration to be transmitted by a transmitting device before polling the receiving device for information regarding reception by the receiving device of the transmitted data.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. User equipment (UE) comprising:
a transceiver configured to transmit and receive signals from an enhanced Node B (eNB) in a network; and
processing circuitry configured to:
determine whether to implement a coverage enhancement radio link control (RLC) configuration, the coverage enhancement RLC configuration configured to be used by the UE when operating in a coverage enhancement mode in which additional link budget is to be obtained without increasing transmission power and disposed in a location in which a link budget to a nearest serving eNB is worse than a typical link budget value, and
use the coverage enhancement RLC configuration to communicate with the eNB in response to determining to implement the coverage enhancement RLC configuration, the coverage enhancement RLC configuration containing values of RLC counters and timers configured to decrease an amount of time before the UE in the coverage enhancement mode is able to request acknowledgment of a transmission to the eNB compared with a non-coverage enhancement RLC configuration.

2. The UE of claim 1, wherein the transceiver is configured to receive the coverage enhancement RLC configuration from a signal by the eNB, the processing circuitry configured to implement the coverage enhancement RLC configuration based on the received signal.

3. The UE of claim 2, wherein the transceiver is configured to transmit a request for the coverage enhancement RLC configuration to the eNB and, in response, receive the coverage enhancement RLC configuration.

4. The UE of claim 3, wherein the request s a RRCConnectionSetup or RRCConnectionReconfiguration request.

5. The UE of claim 1, wherein the processing circuitry is configured to:
determine whether to implement the coverage enhancement RLC configuration without the transceiver receiving a broadcast by the eNB containing the coverage enhancement RLC configuration, and
automatically implement the coverage enhancement RLC configuration based on information stored in the memory regarding the UE previously using the coverage enhancement RLC configuration.

6. The UE of claim 1, wherein, after the processing circuitry has determined to implement the coverage enhancement RLC configuration to communicate with the eNB, the transceiver is configured to transmit to the eNB a Radio Resource Control (RRC) Connection Request based on the coverage enhancement RLC configuration to establish an RRC connection with the eNB in response to the HE initiating a mobile originated call or data session or the HE receiving a paging message from the eNB.

7. The UE of claim 1, wherein the coverage enhancement RLC configuration is contained in an Information Element (IE) in a System Information Block (SIB), the processing circuitry further configured to prevent an RLC transmitter window of the UE from stalling or waiting for several minutes before getting feedback from the eNB based on values of "PollPDU" and "PollByte" in the coverage enhancement RLC configuration.

8. The UE of claim 7, wherein the values of "PollPDU" and "PollByte" in the coverage enhancement RLC configuration are 1 packet data unit and 0.5 kB, respectively.

9. The UE of claim 1, wherein the processing circuitry is configured to determine whether to implement the coverage enhancement RLC configuration dependent on the UE at least one of:
a) being unable to:
obtain downlink synchronization acquisition of a primary synchronization channel and secondary synchronization channel from the eNB within a predetermined sync period,
obtain system information acquisition from the eNB within a predetermined acquisition period, or
complete a Random Access procedure within a predetermined access period,
b) exceeding:
the sync period a predetermined number of consecutive times without obtaining the downlink synchronization acquisition,
the acquisition period a predetermined number of consecutive times without completing the Random Access procedure, or
the access period a predetermined number of times without completing the Random Access procedure,
c) being able to:
obtain the downlink synchronization from the eNB only by using alternate synchronization signals specific to coverage enhancement mode UEs,
complete the Random Access procedure only by using a Random Access procedure specific to coverage enhancement mode UEs, or
obtain system information from the eNB only by using an alternate system information broadcasting procedure,
d) determining that a Reference Symbols Received Power is below a predetermined symbol threshold for a predetermined amount of time, or
e) determining that the UE can be reached by eNB only by the eNB using coverage enhancement specific paging procedures.

10. The UE of claim 1, wherein the UE is a smartphone.

11. The UE, of claim 1, wherein the UE is a machine type device (MTD) configured to communicate using machine type communications.

12. The UE of claim 1, wherein the UE is a sensor configured to remain indefinitely in a single location.

13. The UE of claim 1, further comprising an antenna configured to transmit and receive communications between the transceiver and the eNB.

14. An enhanced Node B (eNB) comprising:
a transceiver configured to transmit and receive signals from user equipment (UE); and
processing circuitry configured to:
determine whether to implement a coverage enhancement radio link control (RLC) configuration, the coverage enhancement RLC configuration configured to be used by the UE when operating in a coverage enhancement mode in which additional link budget is to be obtained without increasing transmission power and disposed in a location in which a link budget to a nearest serving eNB is worse than a typical link budget value, and
use the coverage enhancement RLC configuration to communicate with the UE in response to determining to implement the coverage enhancement RLC configuration, the coverage enhancement RLC configuration containing values of RLC counters and timers configured to decrease an amount of time before the UE in the coverage enhancement mode is able to request acknowledgment of a transmission to the eNB compared with a non-coverage enhancement RLC configuration.

15. The eNB of claim 14, wherein the transceiver is configured to transmit the coverage enhancement RLC configuration in a broadcast or unicast RRC message.

16. The eNB of claim 15, wherein the request is a RRCConnectionSetup or RRCConnectionReconfiguration request.

17. The eNB of claim 14, wherein the processing circuitry is configured to automatically implement the coverage enhancement RLC configuration based on information stored in the memory regarding the UE previously using the coverage enhancement RLC configuration.

18. The eNB of claim 14, wherein the coverage enhancement RLC configuration is contained in an Information Element (UE) in a System Information Block (SIB), the processing circuitry further configured to prevent an RLC transmitter window of the UE from stalling or waiting for several minutes before getting feedback from the eNB based on values of "PollPDU" and "PollByte" in the coverage enhancement RLC configuration, wherein the values of "PollPDU" and "PollByte" in the coverage enhancement RLC configuration are 1 packet data unit and 0.5 kB, respectively.

19. The eNB of claim 14, wherein the transceiver is further configured to broadcast different thresholds defining different levels of coverage enhancement, the different levels of coverage enhancement indicating different amounts of additional link budget for UEs of different categories.

20. The eNB of claim 14, wherein the processing circuitry is further configured to at least one of:
 a) determine that power of random access preambles received from the UE is below a predetermined threshold for a consecutive number of preambles, or
 b) determine that power of a random access preamble in a RRC Connection Request message received from the UE is below a predetermined threshold for a consecutive number of transmission time intervals, and
 in response determine that the UE is in coverage enhancement mode and the coverage enhancement RLC configuration is to be used.

21. The eNB of claim 14, wherein the processing circuitry is further configured to at least one of:
 a) determine that no response from the UE has been received within a predetermined paging period to paging attempts,
 b) determine that no response from the UE has been received to a predetermined number of paging attempts within a predetermined paging period, or
 c) determine that the UE can be reached by the eNB only by using coverage enhancement specific paging procedures, and
 in response determine that the UE is in coverage enhancement mode and the coverage enhancement RLC configuration is to be used.

22. The eNB of claim 14, wherein the processing circuitry is further configured to determine that a specific random access preamble combination has been received from the UE, and in response determine that the UE is in coverage enhancement mode and the coverage enhancement RLC configuration is to be used.

23. A non-transitory computer-readable storage medium that stores instructions for execution by one or more processors of a user equipment (UE) to configure the UE to communicate with an enhanced Node B (eNB) in a network using a coverage enhancement radio link control (RLC) configuration, the one or more processors to configure the UE to:
 determine whether to implement a coverage enhancement radio link control (RLC) configuration, the coverage enhancement RLC configuration configured to be used by the UE when operating in a coverage enhancement mode in which additional link budget is to be obtained without increasing transmission power and disposed in a location in which a link budget to a nearest serving eNB is worse than a typical link budget value, and
 use the coverage enhancement RLC configuration to communicate with the eNB in response to determining to implement the coverage enhancement RLC configuration, the coverage enhancement RLC configuration containing values of RLC counters and timers configured to decrease an amount of time before the UE in the coverage enhancement mode is able to request acknowledgment of a transmission to the eNB compared with a non-coverage enhancement RLC configuration.

24. The non-transitory computer-readable storage medium of claim 23, wherein the one or more processors further configure the UE to one of:
 receive the coverage enhancement RLC configuration from a broadcast by the eNB and implement the coverage enhancement RLC configuration in response to the received broadcast, or
 automatically implement the coverage enhancement RLC configuration based on information stored in the memory regarding the UE previously using the coverage enhancement RLC configuration.

25. The non-transitory computer-readable storage medium of claim 23, wherein the coverage enhancement RLC configuration is contained in an Information Element (IE) in a System Information Block (SIB), the one or more processors further configure the UE to prevent an RLC transmitter window of the UE from stalling or waiting for several minutes before getting feedback from the eNB based on values of "PollPDU" and "PollByte" in the coverage enhancement RLC configuration, the values of "PollPDU" and "PollByte" in the coverage enhancement RLC configuration being 1 packet data unit and 0.5 kB, respectively.

26. A method of configuring user equipment (UE) to use a coverage enhancement radio link control (RLC) configuration to communicate with an enhanced Node B (eNB) in a network, the method comprising:
 determining whether to implement the coverage enhancement RLC configuration, the coverage enhancement RLC configuration configured to be used by UEs in a coverage enhancement mode and situated in locations where a link budget to a nearest serving eNB is worse than a typical link budget value in the network, and
 in response to determining to implement the coverage enhancement RLC configuration, using the coverage enhancement RLC configuration to communicate with the eNB, the coverage enhancement RLC configuration containing a plurality of values of "PollByte" less than 25 kB and at least 0.5 kB.

27. The method of claim 26, further comprising:
 transmitting a Radio Resource Control (RRC) Connection Request to the eNB; and
 receiving the coverage enhancement RLC configuration in response to the RRC Connection Request.

28. The method of claim 26, further comprising at least one of:
 receiving the coverage enhancement RLC configuration from a broadcast by the eNB,
 automatically implementing the coverage enhancement RLC configuration based on stored information regarding the UE previously using the coverage enhancement RLC configuration without having received a broadcast from the eNB containing the coverage enhancement RLC configuration, or
 the coverage enhancement RLC configuration contains a plurality of values of "PollPDU" between 1 and 4 packet data units.

29. The method of claim 26, wherein:
 the coverage enhancement RLC configuration contains values of RLC counters and timers configured to decrease an amount of time before the UE in the coverage enhancement mode is able to request acknowledgment of a transmission to the eNB compared with a non-coverage enhancement RLC configuration.

\* \* \* \* \*

UNITED STATES PATENT AND TRADEMARK OFFICE
CERTIFICATE OF CORRECTION

PATENT NO. : 10,271,224 B2  
APPLICATION NO. : 15/039642  
DATED : April 23, 2019  
INVENTOR(S) : Dimou et al.

Page 1 of 1

It is certified that error appears in the above-identified patent and that said Letters Patent is hereby corrected as shown below:

In the Claims

Column 15, Line 18, in Claim 4, delete "s" and insert --is-- therefor

Column 15, Line 37, in Claim 6, delete "HE" and insert --UE-- therefor

Column 15, Line 38, in Claim 6, delete "HE" and insert --UE-- therefor

Column 16, Line 19, in Claim 9, before "eNB", insert --the--

Column 16, Line 23, in Claim 11, delete "UE," and insert --UE-- therefor

Signed and Sealed this  
Twenty-eighth Day of April, 2020

Andrei Iancu  
*Director of the United States Patent and Trademark Office*